United States Patent
Kim

(10) Patent No.: US 9,864,452 B2
(45) Date of Patent: Jan. 9, 2018

(54) COORDINATES INDICATION DEVICE AND COORDINATES MEASUREMENT DEVICE FOR MEASURING INPUT POSITION OF THE COORDINATES INDICATION DEVICE

(71) Applicant: Samsung Electronics Co., Ltd., Gyeonggi-do (KR)

(72) Inventor: Byung-Jik Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 14 days.

(21) Appl. No.: 13/892,976

(22) Filed: May 13, 2013

(65) Prior Publication Data
US 2013/0300712 A1 Nov. 14, 2013

(30) Foreign Application Priority Data
May 11, 2012 (KR) .................. 10-2012-0050277

(51) Int. Cl.
G06F 3/045 (2006.01)
G06F 3/041 (2006.01)
G06F 3/044 (2006.01)
G06F 3/0354 (2013.01)

(52) U.S. Cl.
CPC ........ G06F 3/0416 (2013.01); G06F 3/03545 (2013.01); G06F 3/044 (2013.01); *G06F 2203/04104* (2013.01); *G06F 2203/04106* (2013.01)

(58) Field of Classification Search
CPC .... G06F 3/0416; G06F 3/03545; G06F 3/044; G06F 2203/04106; G06F 2203/04104
See application file for complete search history.

(56) References Cited

U.S. PATENT DOCUMENTS

| | | | |
|---|---|---|---|
| 4,786,765 A | 11/1988 | Yamanami et al. | |
| 5,134,689 A | 7/1992 | Murakami et al. | |
| 5,633,471 A | 5/1997 | Fukushima | |
| 5,790,106 A | 8/1998 | Hirano et al. | |
| 6,118,437 A | 9/2000 | Fleck et al. | |
| 8,253,697 B2 * | 8/2012 | Fleck .................... | G06F 3/0418 178/18.01 |
| 2006/0109252 A1 | 5/2006 | Kolmykov-Zotov et al. | |
| 2007/0195009 A1 * | 8/2007 | Yamamoto ............ | G06F 1/1652 345/1.1 |
| 2008/0048990 A1 * | 2/2008 | Cho et al. ..................... | 345/173 |

(Continued)

FOREIGN PATENT DOCUMENTS

CN 1138164 12/1996
CN 102187236 9/2011

(Continued)

OTHER PUBLICATIONS

European Search Report dated Mar. 2, 2016 issued in counterpart application No. 13167455.8-1959, 8 pages.

(Continued)

*Primary Examiner* — Andrew Sasinowski
(74) *Attorney, Agent, or Firm* — The Farrell Law Firm, P.C.

(57) ABSTRACT

A coordinates measurement system for measuring positions of a finger and a coordinates indication device other than the finger is provided, which determines the touched position of an object such as a stylus pen, while using a single touch screen.

20 Claims, 8 Drawing Sheets

(56) References Cited

U.S. PATENT DOCUMENTS

| | | | |
|---|---|---|---|
| 2008/0150914 A1* | 6/2008 | Yamamoto | G06F 3/046 345/175 |
| 2008/0150916 A1 | 6/2008 | Vos | |
| 2008/0158165 A1* | 7/2008 | Geaghan | G06F 3/03545 345/173 |
| 2009/0065269 A1* | 3/2009 | Katsurahira | G06F 3/046 178/19.06 |
| 2009/0076770 A1* | 3/2009 | Fukushima | G06F 3/03545 702/150 |
| 2010/0073323 A1 | 3/2010 | Geaghan | |
| 2010/0321325 A1* | 12/2010 | Springer et al. | 345/174 |
| 2011/0141052 A1* | 6/2011 | Bernstein et al. | 345/174 |
| 2012/0050207 A1 | 3/2012 | Westhues et al. | |
| 2012/0062521 A1 | 3/2012 | Ahn et al. | |
| 2012/0092350 A1* | 4/2012 | Ganapathi et al. | 345/501 |
| 2013/0038565 A1* | 2/2013 | Elloway et al. | 345/174 |
| 2013/0135220 A1* | 5/2013 | Alameh et al. | 345/173 |
| 2013/0281016 A1* | 10/2013 | McFarthing | 455/41.1 |

FOREIGN PATENT DOCUMENTS

| | | |
|---|---|---|
| JP | 5-241722 | 9/1993 |
| JP | 06-202788 | 7/1994 |
| JP | 7-121289 | 5/1995 |
| JP | 2006-146936 | 6/2006 |
| JP | 2008-152640 | 7/2008 |
| JP | 2009-020718 | 1/2009 |
| WO | WO 2012/047052 | 4/2012 |

OTHER PUBLICATIONS

Chinese Office Action dated Dec. 5, 2016 issued in counterpart application No. 201310174256.X, 16 pages.

Japanese Office Action dated Feb. 20, 2017 issued in counterpart application No. 2013-099929, 8 pages.

Japanese Office Action dated Jul. 24, 2017 issued in counterpart application No. 2013-099929, 15 pages.

* cited by examiner

COORDINATES INDICATION DEVICE AND COORDINATES MEASUREMENT DEVICE FOR MEASURING INPUT POSITION OF THE COORDINATES INDICATION DEVICE

PRIORITY

This application claims priority under 35 U.S.C. §119(a) to a Korean Patent Application filed in the Korean Intellectual Property Office on May 11, 2012 and assigned Serial No. 10-2012-0050277, the contents of which are incorporated herein by reference.

BACKGROUND OF THE INVENTION

1. Field of the Invention

The present invention relates generally to a coordinates indication device, and a coordinates measurement device for measuring an input position of the coordinates indication device, and more particularly, to a finger or a coordinates indication device, such as a stylus pen, and a coordinates measurement device for measuring an input position of the finger or the coordinates indication device.

2. Description of the Related Art

Along with the recent rapid growth of smart phones or tablet Personal Computers (PCs), built-in devices for measuring the positions of touches on the smart phones or tablet PCs have been extensively developed. A smart phone or a tablet PC is usually equipped with a touch screen on which a user designates specific coordinates using his or her finger or a stylus pen, and may thus input a specific signal to the smart phone or tablet PC.

Touch screens may operate in an electrical, infrared, or ultrasonic wave fashion. A Resistive (R-type) touch screen and a Capacitive (C-type) touch screen are examples of an electrically-operating touch screen. Previously, the R-type touch screen that can recognize inputs of a user's finger and a stylus pen simultaneously was the most popular. However, the R-type touch screen suffers from problems caused by reflection from an air gap between Indium Tin Oxide (ITO) layers. Specifically, the transmittance of light transmitted through a display is decreased and external light reflection is increased due to the air gap between the ITO layers in the R-type touch screen.

Accordingly, the C-type touch screen has recently gained popularity. The C-type touch screen operates by sensing the difference between the capacitances of transparent electrodes generated by an object's touch. Although the C-type touch screen can relatively accurately sense the position of an object touching a large area such as a finger, it has difficulty in accurately sensing the position of an object, such as a stylus pen, touching a small area. Moreover, the C-type touch screen cannot physically distinguish a hand or finger from a stylus pen, thereby causing an operation error in regard to an unintended hand touch.

To prevent the above-described operation error by more accurately sensing the touched position of a stylus pen, an ElectroMagnetic Resonance (EMR) position measurement device is conventionally used in addition to the C-type touch screen. However, the additional use of the EMR position measurement device leads to an increase in the volume, weight, and cost of the smart phone or tablet PC.

Accordingly, there exists a need for developing a technique which determines the input position of an object, such as a stylus pen, without an operation error, even though an additional element such as an EMR sensor is not used.

SUMMARY OF THE INVENTION

An aspect of embodiments of the present invention is to address at least the problems and/or disadvantages and to provide at least the advantages described below. Accordingly, an aspect of embodiments of the present invention is to provide a coordinates indication device and a coordinates measurement device which determines the touched position of an object such as a stylus pen, while using a single touch screen.

In accordance with an embodiment of the present invention, there is provided a coordinates measurement system for measuring positions of a finger and a coordinates indication device other than the finger, in which when the finger approaches, capacitance of at least one channel electrode or capacitance between channel electrodes is changed in a channel electrode unit, a driver applies an electrical signal to the channel electrode unit so that each of the at least one channel electrode of the channel electrode unit outputs a drive signal, a coordinates indication device receives the drive signal, an additional receiver is disposed separately from the channel electrode unit and receives information about strength of the drive signal received at the coordinates indication device from the coordinates indication device, and a controller determines an input position of the finger based on a variation in the capacitance of the at least one channel electrode or the capacitance between the channel electrodes and determines a position of the coordinates indication device based on the information received from the additional receiver.

In accordance with another embodiment of the present invention, there is provided a coordinates measurement system for measuring positions of a finger and a coordinates indication device other than the finger, in which when the finger approaches, capacitance of at least one channel electrode or capacitance between channel electrodes is changed in a channel electrode unit, a driver applies an electrical signal to the channel electrode unit so that each of the at least one channel electrode of the channel electrode unit outputs a drive signal, a coordinates indication device receives the drive signal, an additional transceiver is disposed separately from the channel electrode unit, transmits an electromagnetic signal to the coordinates indication device, and receives information about strength of the drive signal received at the coordinates indication device from the coordinates indication device, and a controller determines an input position of the finger based on a variation in the capacitance of the at least one channel electrode or the capacitance between the channel electrodes and determines a position of the coordinates indication device based on the information received from the additional transceiver.

In accordance with a further embodiment of the present invention, there is provided a coordinates measurement system in which a panel unit has a plurality of channel electrodes arranged, each channel electrode for generating an electrical signal, a driver applies an electrical signal to the channel electrodes or between the channel electrodes, an antenna receives a signal generated from the driver, a coordinate indication device transmits information about strength of the received signal, an additional receiver receives the information about the strength of the signal, and a controller determines a position at which the coordinate indication device has touched the panel unit, using the received information.

BRIEF DESCRIPTION OF THE DRAWINGS

The above and other objects, features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Reference will now be made to embodiments of the present invention with reference to the attached drawings. A detailed description of a generally known function and structure of the present invention will be avoided lest it should obscure the subject matter of the present invention.

Figure 1:
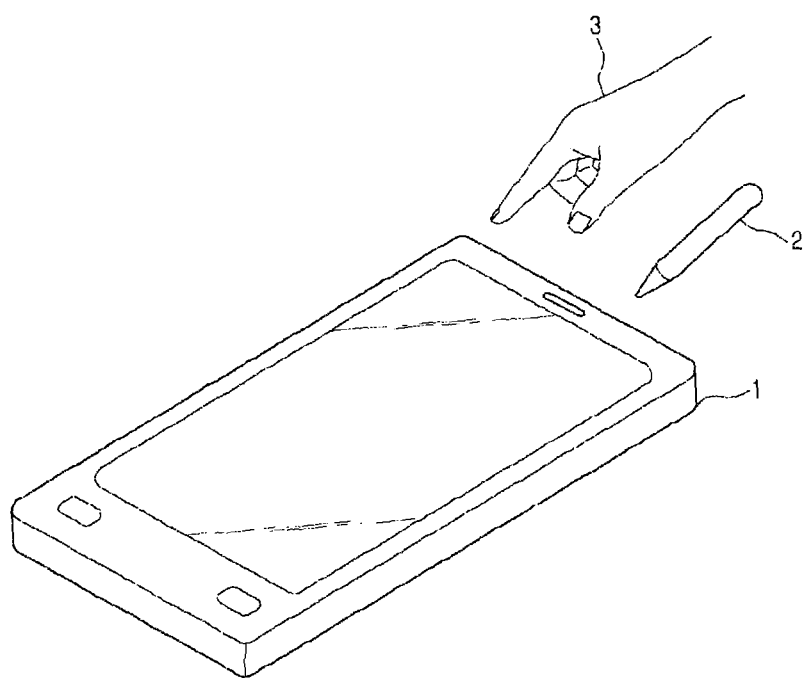
FIG. 1 illustrates a coordinates indication system according to an embodiment of the present invention.

FIG. 1 illustrates a coordinates indication system according to an embodiment of the present invention. Referring to FIG. 1, a coordinates measurement device 1 may detect an input applied by a coordinates indication device 2 or a user's body part, such as a finger 3, and measure the coordinates of the position of the input.

While the coordinates measurement device 1 is shown as a smart phone or tablet PC in FIG. 1, the present invention is not limited to any specific type. So long as the device includes a channel electrode unit, a controller, and an additional receiver, for coordinates measurement, any electronic device can be used as the coordinates measurement device 1.

The coordinates indication device 2 may take the form of a stylus pen, for example. The coordinates indication device 2 designates specific coordinates on the coordinates measurement device 1 by touching the coordinates measurement device 1. Compared to the finger 3, the coordinates indication device 2 touches the coordinates measurement device 1 over a relatively small area. The coordinates indication device 2 transmits information about its position to the coordinates measurement device 1. The coordinates indication device 2 or the coordinates measurement device 1 determines the actual position of the coordinates indication device 2 based on the position information about the coordinates indication device 2.

The position information about the coordinates indication device 2 may be information about the strengths of drive signals received from the coordinates measurement device 1 by the coordinates indication device 2. Hereinafter, the driver signals are referred to as Transmission (Tx) signals.

The coordinates measurement device 1 measures the touched position of the coordinates indication device 2 based on the received position information. A configuration of the coordinates measurement device 1 for measuring the position of the coordinates indication device 2 will be described later in greater detail. The position information about the coordinates indication device 2 may be provided to the coordinates measurement device 1 in one of acoustic waves, ultrasonic waves, infrared rays, an electromagnetic signal, and Bluetooth®.

The coordinates measurement device 1 measures an input position of the user's finger 3 as well as the coordinates indication device 2. For example, the coordinates measurement device 1 measures the input position of the user's finger 3 based on a capacitance variation caused by the finger's touch. Additionally, the coordinates measurement device 1 measures the input position of a conductive object.

Therefore, the coordinates measurement device 1 may simultaneously measure the input positions of the user's finger 3 and the coordinates indication device 2 such as a stylus pen. More specifically, the coordinates measurement device 1 measures the position of the coordinates indication device 2 such as a stylus pen by analyzing the position information about the coordinates indication device 2 received from the coordinates indication device 2. The coordinates measurement device 1 may also measure the position of the finger 3, for example, based on a capacitance variation caused by the finger's touch.

Figure 2:
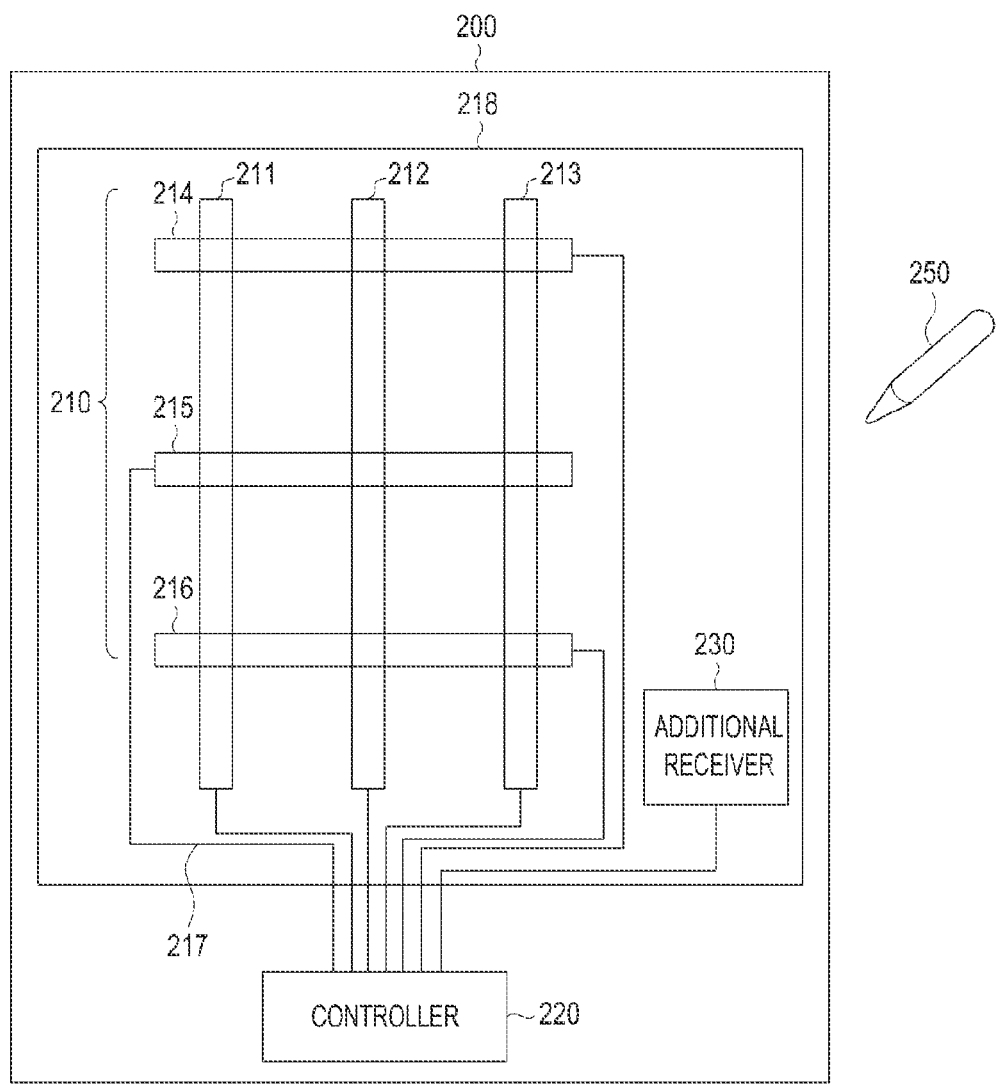
FIG. 2 illustrates a coordinates measurement device according to an embodiment of the present invention.

FIG. 2 illustrates a coordinates measurement device according to an embodiment of the present invention.

Referring to FIG. 2, a coordinates measurement device 200 includes a panel unit 218 and a controller 220.

The panel unit 218 includes a channel electrode unit 210, connecting electrode lines 217, and an additional receiver 230 and may receive or transmit specific signals from or to the controller 220. The controller 220 generates drive signals, receives signals from the panel unit 218, and measures an input position of a coordinates indication device 250. It will be understood to those skilled in the art that the coordinates measurement device 200 may further include image display means such as a Liquid Crystal Display (LCD) or a Cathode Ray Tube (CRT) screen, or a glass film.

The channel electrode unit 210 may be configured into, for example, a touch panel of a C-type touch screen. The channel electrode unit 210 may include a plurality of channel electrodes formed of ITO, for instance.

In FIG. 2, the plurality of channel electrodes of the channel electrode unit 210 are arranged in perpendicular directions, crossing one another. More specifically, the channel electrode unit 210 includes x-axis channel electrodes 211, 212 and 213 for measuring an x-axis input position and y-axis channel electrodes 214, 215 and 216 for measuring a y-axis input position. While three x-axis channel electrodes and three y-axis channel electrodes are shown in FIG. 2, the numbers of the x-axis and y-axis channel electrodes are an example. In addition, each of the channel electrodes is shown as spaced from its adjacent channel electrode by a predetermined distance in FIG. 2. Alternatively, the channel electrodes may overlap their adjacent channel electrodes, for more accurate measurement of an input position.

The x-axis channel electrodes 211, 212 and 213 are arranged longer along the y-axis than along the x-axis, for sensing x-axis coordinates. The y-axis channel electrodes 214, 215 and 216 are arranged longer along the x-axis than along the y-axis, for sensing y-axis coordinates. The x-axis channel electrodes 211, 212 and 213 may receive specific electrical signals from the controller 220. For example, the controller 220 may apply specific electrical signals having the same strength to the x-axis channel electrodes 211, 212 and 213 for a predetermined time. The y-axis channel electrodes 214, 215 and 216 may also receive specific electrical signals from the controller 220. For example, the controller 220 may apply specific electrical signals having the same strength to the y-axis channel electrodes 214, 215 and 216 for a predetermined time.

The controller 220 may further include a driver (not shown) which applies electrical signals to the channel electrode unit 210 so that at least one channel electrode may output a Tx signal. The driver may be connected to the channel electrode unit 210. In this case, a connecting electrode line 217 may be added to connect the driver to the channel electrode unit 210. The additional receiver 230 may be formed in the same process as used for fabricating the connecting electrode lines 217. That is, the additional receiver 230 may be disposed on the same plane as a part of the connecting electrode lines 217. For example, the additional receiver 230 and the connecting electrode lines 217 may be arranged on the same glass plane.

The coordinates measurement device 200 measures the position of an input of a user's finger. For example, it is assumed that the user touches an intersection between the x-axis channel electrode 212 and the y-axis channel electrode 215 with his or her finger. The finger's touch changes the self-capacitance of the x-axis channel electrode 212 or the mutual capacitances between the x-axis channel electrode 212 and the other channel electrodes. The controller 210 determines the input position of the finger based on an electrical signal output from each channel electrode. For example, electrical signals output from the x-axis channel electrode 212 and the y-axis channel electrode 215 that have been touched by the finger may have smaller strengths than electrical signals output from the other channel electrodes. The controller 220 determines based on the received electrical signals that the finger has touched the intersection between the x-axis channel electrode 212 and the y-axis channel electrode 215.

The coordinates measurement device 200 measures an input position of the coordinates indication device 250 such as a stylus pen. As described above, the controller 220 may apply specific electrical signals having the same strength to the x-axis channel electrodes 211, 212 and 213 and the y-axis channel electrodes 214, 215 and 216 for a predetermined time. Upon receipt of the electrical signals, the channel electrodes 211 to 216 may generate specific Tx signals that are output to the outside of the coordinates measurement device 200.

The coordinates indication device 250 receives the Tx signals from the channel electrodes 211 to 216 and transmits Reception (Rx) signals including information about the strengths of the received Tx signals to the additional receiver 230.

The coordinates indication device 250 may receive a relatively strong Tx signal from a relatively near channel electrode and a relatively weak Tx signal from a relatively distant channel electrode. This is attributed to attenuation of a Tx signal output from a channel electrode in reverse proportion to the square of the propagation distance of the Tx signal.

The coordinates indication device 250 transmits the Rx signals in real time with movement of the coordinates indication device 250. For example, the coordinates indication device 250 may binarize information about the strengths of the received Tx signals and transmit Rx signals including the binary Tx signal strength information to the additional receiver 230.

As described above, since the controller 220 sequentially receives electrical signals of the channel electrodes 211 to 216, the time series data of the Rx signals received from the coordinates indication device 250 indicates the strengths of the Tx signals that the coordinates indication device 250 has received from the channel electrodes 211 to 216. For example, it is assumed that controller 220 receives sequentially the electrical signals in the order of the channel electrode 211 to the channel electrode 216. In this case, the coordinates indication device 250 determines the strength of a Tx signal received for a first time period is that of a Tx signal received from the channel electrode 211, and the strength of a Tx signal received for a second time period is that of a Tx signal received from the channel electrode 212. In the same manner, the coordinates indication device 250 determines the strengths of Tx signals received for first to sixth time periods are those of Tx signals received from the channel electrodes 211 to 216.

The coordinates indication device 250 transmits an Rx signal including information about the strength of the Tx signal received for the first time period to the additional receiver 230 in real time for the first time period. In the same manner, the coordinates indication device 250 transmits Rx signals including information about the strengths of the Tx signals received for the first to sixth time periods respectively to the additional receiver 230 in real time for the first to sixth time periods.

The controller 220 receives signals indicating the strengths of the Tx signals of the respective channel electrodes 211 to 216 from the additional receiver 230 and determines the input position of the coordinates indication device 250 based on the strengths of the Tx signals.

For example, it is assumed that the coordinates indication device 250 touches the intersection between the x-axis channel electrode 212 and the y-axis channel electrode 215. Table 1 below is an example of listing the strengths of Tx signals received in time series at the coordinates indication device 250.

TABLE 1

| | Time period | | | | | |
|---|---|---|---|---|---|---|
| | $1^{st}$ time period | $2^{nd}$ time period | $3^{rd}$ time period | $4^{th}$ time period | $5^{th}$ time period | $6^{th}$ time period |
| Tx signal strength | 3 | 17 | 4 | 5 | 12 | 2 |

Even though the x-axis and y-axis channel electrodes 211 to 216 generate signals having the same strength, the coordinates indication device 250 receives Tx signals having different strengths for the respective time periods because the x-axis and y-axis channel electrodes 211 to 216 are spaced from the coordinates indication device 250 by different distances.

Therefore, as the coordinates indication device 250 provides information about the strengths of the Tx signals to the additional receiver 230, the controller 220 measures the input position of the coordinates indication device 250 based on the Tx signal strength information.

The coordinates indication device 250 provides the information about the strengths of the Tx signals to the additional receiver 230 by transmitting resonance signals generated with the Tx signals or transmitting Rx signals.

In the latter method, the coordinates indication device 250 generates Rx signals as illustrated in Table 2, as follows, and transmits the Rx signals to the additional receiver 230.

TABLE 2

| | Time period | | | | | |
|---|---|---|---|---|---|---|
| | 1st time period | 2nd time period | 3rd time period | 4th time period | 5th time period | 6th time period |
| Rx signal | 000011 | 010001 | 000100 | 000101 | 001100 | 000010 |

The additional receiver 230 receives the Rx signals listed in Table 2 and the controller 220 determines the strengths of the Tx signals from the Rx signals. For example, the Rx signals received for the first to sixth time periods in Table 2 are represented as binary codes 000011, 010001, 000100, 000101, 001100, and 000010, respectively. Each binary code provides information about the strength of a signal received for each time period in Table 1. The controller 220 interprets the binary codes.

More specifically, the controller 220 determines the strength of the Tx signal received from the x-axis channel electrode 211 at the coordinates indication device 250 for the first time period to be 3 by demodulating the binary code corresponding to the first time period. In the same manner, the controller 220 determines the strength of the Tx signal received from the x-axis channel electrode 212 at the coordinates indication device 250 for the second time period to be 17 by demodulating the binary code corresponding to the second time period. The controller 220 may perform the same operation for the first to sixth time periods and thus may obtain interpretation results as illustrated in Table 3, as follows.

TABLE 3

| | Electrodes | | | | | |
|---|---|---|---|---|---|---|
| | Electrode 211 | Electrode 212 | Electrode 213 | Electrode 214 | Electrode 215 | Electrode 216 |
| Tx signal strength | 3 | 17 | 4 | 5 | 12 | 2 |

The controller 220 determines the input position of the coordinates indication device 250 based on the strengths of the Tx signals received at the coordinates indication device 250, as listed in Table 3. The controller 220 determines the intersection between the x-axis channel electrode 212 and the y-axis channel electrode 215 which correspond to largest Tx signal strengths as the input position. However, the above-described input position decision configuration is an example. Thus, the controller 220 may determine the input position of the coordinates indication device 250 in various manners including interpolation.

The representation of the Rx signals in Table 2 is an example, and the Rx signals may further include additional signals such as synchronization signals. The Rx signals may be changed depending on contact or non-contact between the coordinates indication device 250 and the coordinates measurement device 200. Thus the coordinates measurement device 200 determines contact or non-contact with the coordinates indication device 250. As a consequence, the coordinates measurement device 200 determines the touched pressure of the coordinates indication device 250.

As described above, the coordinates measurement device 200 determines the input position, contact or non-contact, and touched pressure of the coordinates indication device 250. In addition, the coordinates measurement device 200 determines the input position of a finger based on a variation in capacitance or impedance. That is, the coordinates measurement device 200 simultaneously determines the input positions of a finger and a stylus pen, although the single channel electrode unit 210 is included.

Figure 3A:
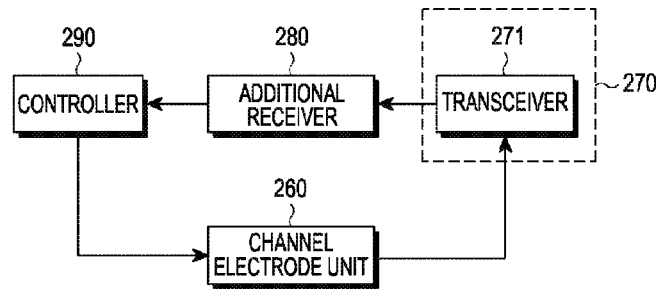
FIGS. 3A, 3B and 3C are block diagrams of coordinates indication devices according to embodiments of the present invention.

FIG. 3A is a block diagram of a coordinates indication device according to an embodiment of the present invention.

Referring to FIG. 3A, a coordinates indication device 270 may include a transceiver 271.

The transceiver 271 may receive Tx signals from a channel electrode unit 260. So long as the device can receive Tx signals, any device can be used as the transceiver 271. For example, an Inductor and Capacitor (LC) resonant circuit may be configured into the transceiver 271. In this case, the transceiver 271 may resonate with the Tx signals and output specific electrical signals, and the resonant frequency of the transceiver 271 may be set to be identical to the frequency of Tx signals output from the channel electrode unit 260.

An additional receiver 280 may receive the resonant signals generated from the coordinates indication device 270.

A controller 290 measures a relative distance between each channel electrode of the channel electrode unit 260 and the coordinates indication device 270 by comparing the strengths of signals received from the additional receiver 280.

Figure 3B:
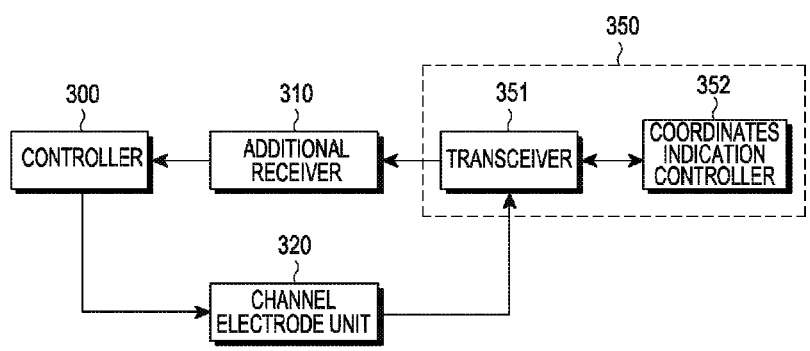

FIG. 3B is a block diagram of a coordinates indication device according to another embodiment of the present invention.

Referring to FIG. 3B, a coordinates indication device 350 may include a transceiver 351 and a coordinates indication controller 352.

The transceiver 351 may receive Tx signals from a channel electrode unit 320. So long as the device can receive Tx signals, any device can be used as the transceiver 351. For example, an LC resonant circuit may be configured into the transceiver 351. In this case, the transceiver 351 may resonate with Tx signals and output specific electrical signals, and the resonant frequency of the transceiver 351 may be set to be identical to the frequency of Tx signals output from the channel electrode unit 320.

The coordinates indication controller 352 measures the strengths of the Tx signals received from the transceiver 351 and extracts information about the strengths of the Tx signals. For example, the coordinates indication controller 351 may binarize the Tx signal strength information, and may sample the received Tx signals in every predetermined period, quantize the sampled Tx signals, and binarize information about strengths of the quantized Tx signals. For example, the coordinates indication controller 352 may binarize information about the strengths of the quantized Tx signals as listed in Table 2. The channel electrode unit 320 may generate Tx signals having the same strength in time series and the coordinates indication controller 352 may generate time-series data corresponding to the strengths of the received Tx signals as illustrated in Table 2. The time-series data may include binary codes.

Figure 4A:
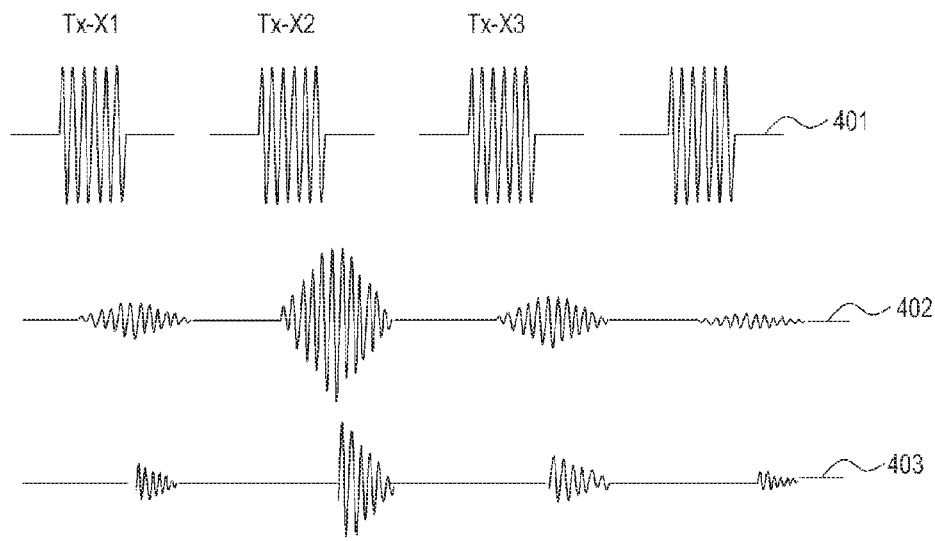
FIGS. 4A and 4B illustrate Reception (Rx) signals according to an embodiment of the present invention.

FIG. 4A illustrates drive signals generated according to an embodiment of the present invention. Reference numeral 401 denotes drive signals having the same strength generated from the channel electrodes and reference numeral 402 denotes drive signals received at the coordinates indication device. The coordinates indication device receives signals having different strengths from the channel electrodes according to the distances to the channel electrodes.

If a resonant circuit is used, the resonant circuit transmits resonant signals corresponding to the signals received at the coordinates indication device to the additional receiver. Reference numeral 403 denotes signals received at the additional receiver.

The coordinates indication device 350 illustrated in FIG. 3B may include an internal power source by which the coordinates indication device 350 operates. The coordinates indication device 350 may be implemented into a stylus pen.

Figure 4B:
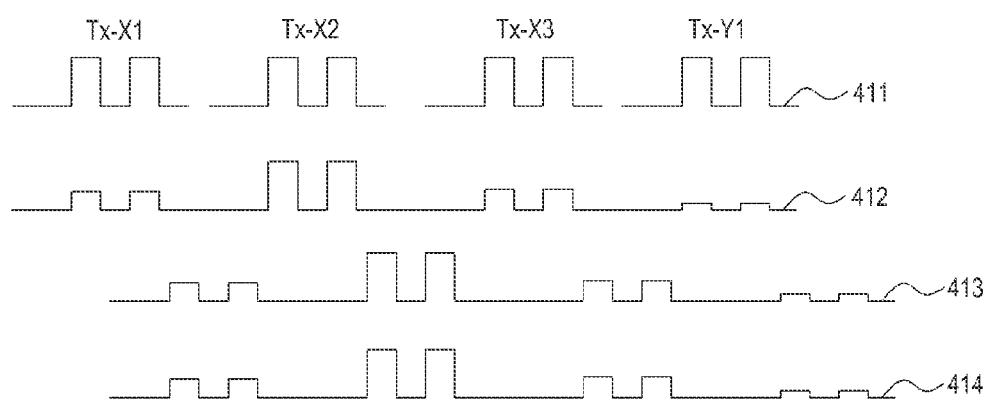

FIG. 4B illustrates drive signals according to another embodiment of the present invention. Reference numeral 411 denotes drive signals having the same strength generated from the respective channel electrodes and reference numeral 412 denotes drive signals received at the coordinates indication device 350. The coordinates indication device 350 receives signals having different strengths from the channel electrodes according to the distances to the channel electrodes.

The coordinates indication controller 352 measures the strengths of the received signals and generates transmission signals of the coordinates indication device 350. Reference numeral 413 denotes the transmission signals of the coordinates indication device 350. The transmission signals of the coordinates indication device 350 may be received at the additional receiver in the form of signals 414.

Figure 3C:
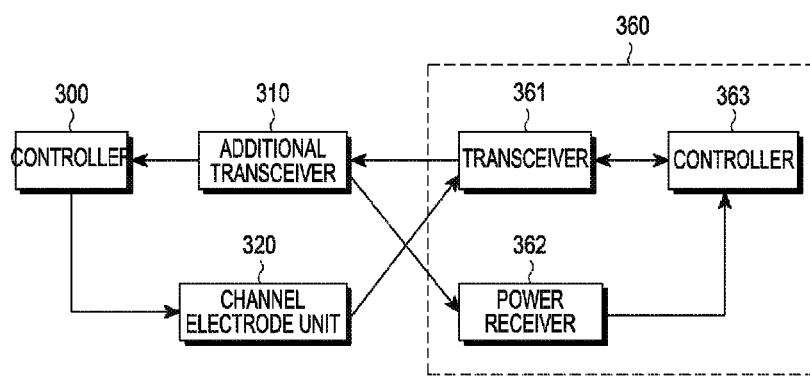

FIG. 3C is a block diagram of a coordinates indication device according to a further embodiment of the present invention. A coordinates indication device 360 illustrated in FIG. 3C does not include an internal power source in the manner of the coordinates indication device illustrated in FIG. 3B. The coordinates indication device 360 includes a transceiver 361, a power receiver 362, and a controller 363.

The transceiver 361 receives Tx signals from a channel electrode unit 320. So long as the device can receive Tx signals, any device can be used as the transceiver 361. For example, the transceiver 361 may be implemented into an LC resonant circuit.

The power receiver 362 receives wireless power from an additional transceiver 310. The power receiver 362 and the additional transceiver 310 may receive power wirelessly, for example, in a resonant method. The power may be received wirelessly by a general Wireless Power Communication (WPC) scheme. The additional transceiver 310 may be physically separated into an additional transmitter and an additional receiver. The transceiver 361 and the power receiver 362 may be configured into a single LC resonant circuit.

The wireless power received at the power receiver 362 may be used to operate the transceiver 361 and the controller 363. The power receiver 362 may include rectifying means, regulating means, or Direct Current (DC)-to-DC conversion means in addition to wireless power reception means.

The controller 363 measures the strengths of Tx signals received from the transceiver 361, measures the strengths of Tx signals received from the transceiver 361 and extracts information about the strengths of the Tx signals. The controller 363 also generates Rx signals including the information about the strengths of the Tx signals and controls the transceiver 361 to transmit the Rx signals.

As described above with reference to FIGS. 3A, 3B and 3C, the coordinates indication device transmits information about the strengths of Tx signals to the coordinates measurement device, while it may or may not include an internal power source.

Figure 5:
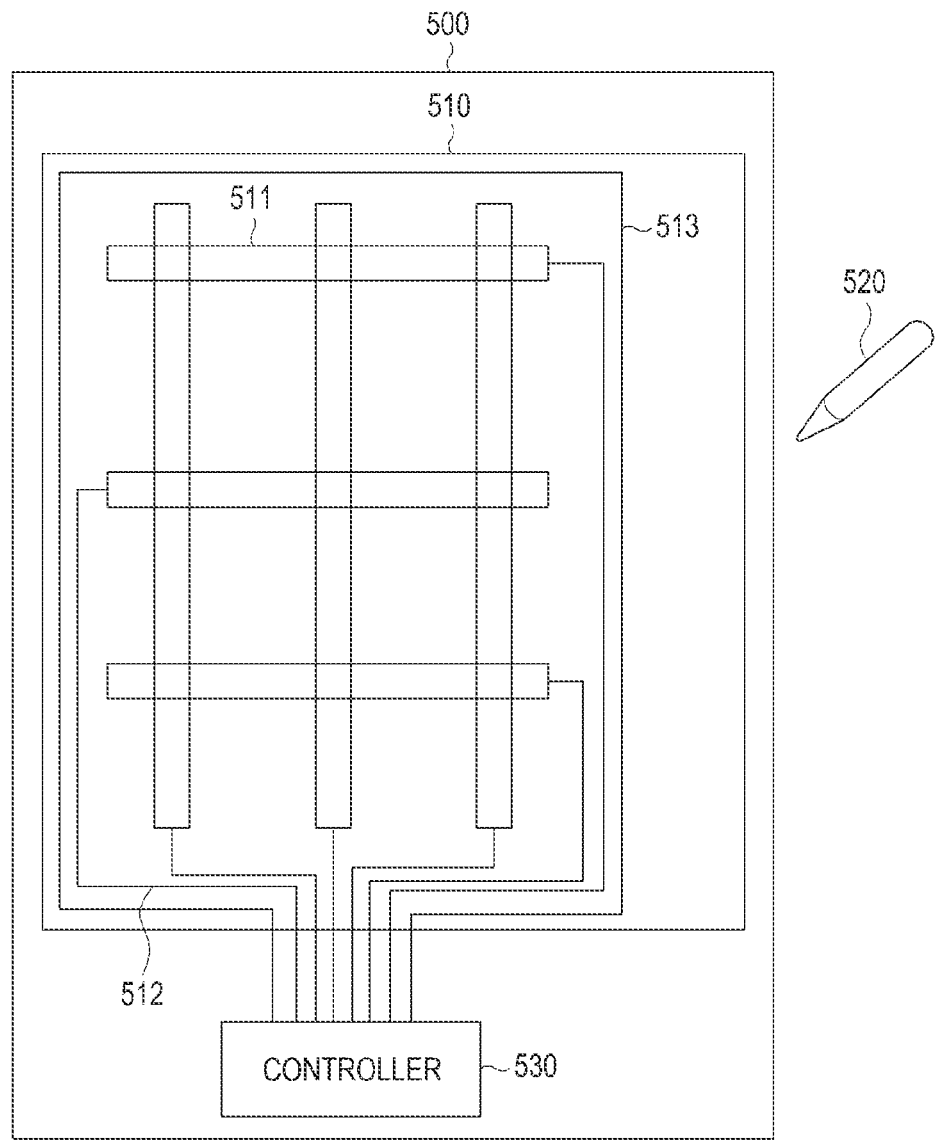
FIG. 5 illustrates wireless power transmission/reception according to an embodiment of the present invention.

FIG. 5 illustrates wireless power transmission/reception according to an embodiment of the present invention. Referring to FIG. 5, a coordinates measurement device 500 includes a panel unit 510 and a controller 530. In the panel unit 510, an additional transceiver 513 supplies operation power to a coordinates indication device 520. Therefore, the coordinates indication device 520 may not have an internal power source and instead, may receive wireless power from the coordinates measurement device 500. The additional transceiver 513 may be disposed along the periphery of the panel unit 510. The coordinates measurement device 500 may further include a display unit and the additional transceiver 513 may be disposed along the periphery of an active area of the display unit.

The additional transceiver 513 may supply wireless power in a different frequency from that of Tx signals output from a channel electrode unit 511 to the coordinates indication device 520, and may be configured with electrodes in one or more loops.

Figure 6:
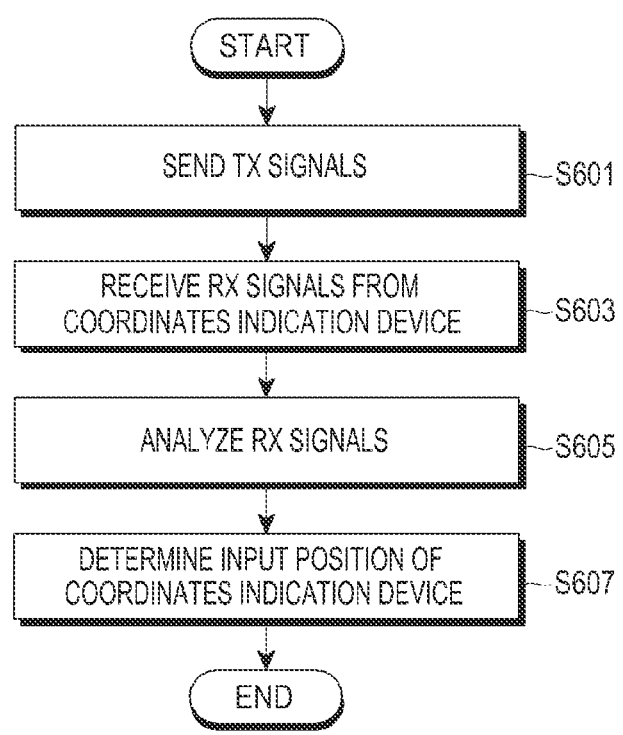
FIG. 6 illustrates a method for controlling the coordinates measurement device according to an embodiment of the present invention.

FIG. 6 illustrates a method for controlling the coordinates measurement device according to an embodiment of the present invention.

Referring to FIG. 6, the coordinates measurement device transmits Tx signals in step S601 that are output from the respective channel electrodes of the coordinates measurement device and transmitted in time series in a predetermined order of the channel electrodes.

The coordinates measurement device receives Rx signals from the coordinates indication device in step S603. The Rx signals are generated from the coordinates indication device, and include information about the strengths of the Tx signals received from the channel electrodes at the coordinates indication device. The information about the strengths of the received Tx signals may be represented as binary codes, for example, as illustrated in Table 2. The Rx signals may further include synchronization signals.

The coordinates measurement device analyzes the received Rx signals in step S605. For instance, the coordinates measurement device may obtain information about the strengths of the Tx signals that the coordinates indication device has received from the channel electrodes, for example, the analysis results illustrated in Table 3 by analyzing the binary codes of the received Rx signals.

The coordinates measurement device determines an input position of the coordinates indication device based on the analysis results in step S607. The coordinates measurement device determines the intersection between x-axis and y-axis channel electrodes having largest Tx signal strengths as the input position. However, the input position decision configuration is an example, and various methods including interpolation are available in determining an input position of the coordinates indication device.

Figure 7:
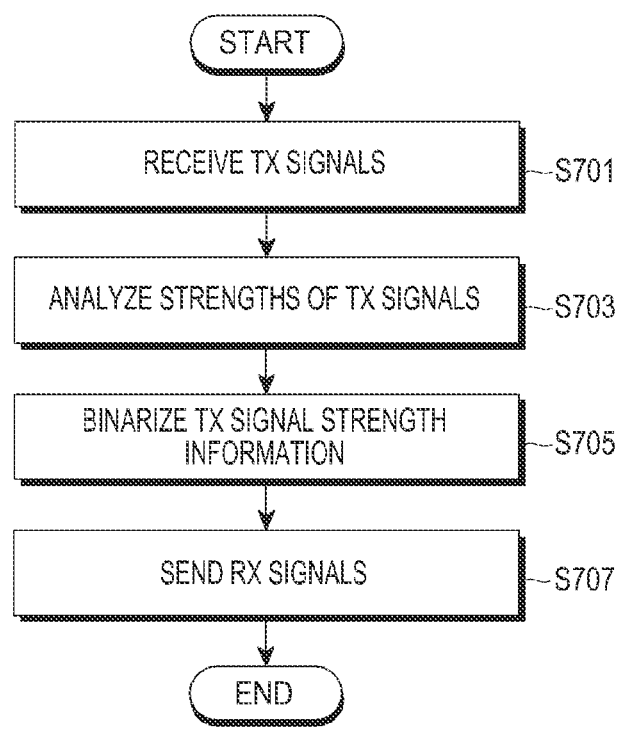
FIG. 7 illustrates a method for controlling the coordinates indication device according to an embodiment of the present invention.

FIG. 7 illustrates a method for controlling the coordinates indication device according to an embodiment of the present invention.

Referring to FIG. 7, the coordinates indication device receives Tx signals from the respective channel electrodes in step S701. The coordinates indication device may receive a relatively strong Tx signal from a relatively near channel electrode and a relatively weak Tx signal from a relatively distant channel electrode.

The coordinates indication device analyzes the strengths of the received Tx signals in step S703. For example, the coordinates indication device may sample the received Tx signals, quantize the sampled Tx signals, and thus acquire information about the strengths of the received Tx signals.

The coordinates indication device binarizes the information about the strengths of the Tx signals in step S705. For example, the coordinates indication device may binarize the information about the strengths of the Tx signals by load modulation using a switch, and may generate Rx signals including the binary information about the strengths of the Tx signals.

The coordinates indication device transmits the Rx signals to the additional receiver in step S707.

As described above, the coordinates measurement device measures a touched position of the coordinates indication device, although the coordinates measurement device has a single panel.

Figure 8:
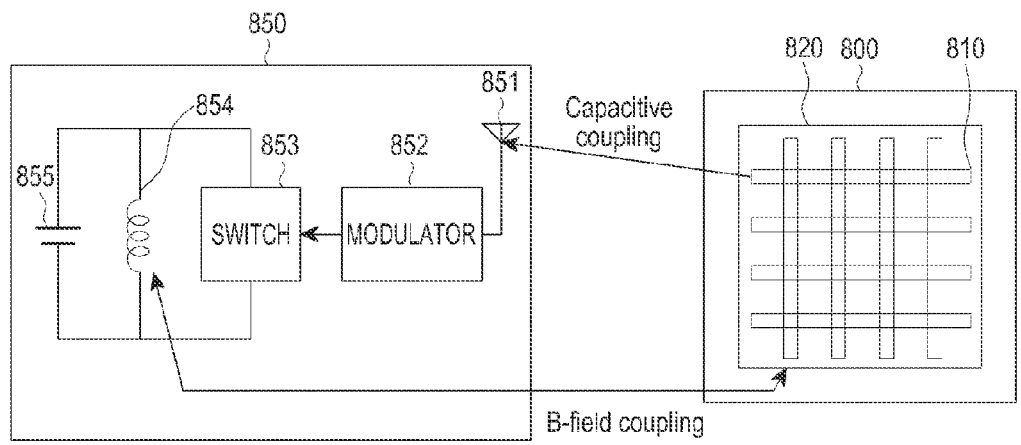
FIG. 8 illustrates a coordinates indication device and a coordinates measurement device according to an embodiment of the present invention.

FIG. 8 illustrates a coordinates indication device and a coordinates measurement device according to an embodiment of the present invention.

Referring to FIG. 8, a coordinates designation system includes a coordinates measurement device 800 and a coordinates indication device 850. The coordinates measurement device 800 includes a channel electrode unit 810 and an additional transceiver 820. The coordinates indication device 850 includes an antenna 851, a modulator 852, a switch 853, a coil 854, and a capacitor 855.

The channel electrode unit 810 of the coordinates measurement device 800 includes a plurality of channel electrodes that extend in the x and y directions and are arranged on a panel. The additional transceiver 820 is formed into a loop coil and is disposed along the periphery of an active area in a display area. A driver (not shown) may apply an electrical signal to the channel electrode unit 810 and the channel electrode unit 810 may output Tx signals. The channel electrode unit 810 is capacitively coupled with the antenna 851 of the coordinates indication device 850. B-field coupling may occur between the additional transceiver 820 and the coil 854. The antenna 851 receives the Tx signals from the capacitively coupled channel electrode unit 810. As described before with reference to FIG. 2, the channel electrodes of the channel electrode unit 810 output the Tx signals in a predetermined order. The antenna 851 receives the Tx signals from the channel electrodes in the predetermined order over time.

The modulator 852 modulates information about the strengths of the Tx signals received from the channel electrodes. The coil 854 transmits the information about the strengths of the Tx signals to the B-field-coupled additional transceiver 820.

The resonance characteristics of a resonant circuit formed with the coil 854 and the capacitor 855 are changed according to on-state or off-state of the switch 853. That is, if the switch 853 is in the on-state, the resonant circuit does not resonate. The resonant circuit resonates only when the switch 853 is in the off-state. Therefore, the modulator 852 may modulate resonant signals to binary information in correspondence with the strengths of the Tx signals, based on the on-state/off-state of the switch 853.

The additional transceiver 820 transmits electromagnetic energy to the resonant circuit 854 and 855 so that the coordinates indication device 850 may use the electromagnetic energy as an energy source. The additional transceiver 820 receives Rx signals corresponding to the information about the strengths of the Tx signals.

Figure 9:
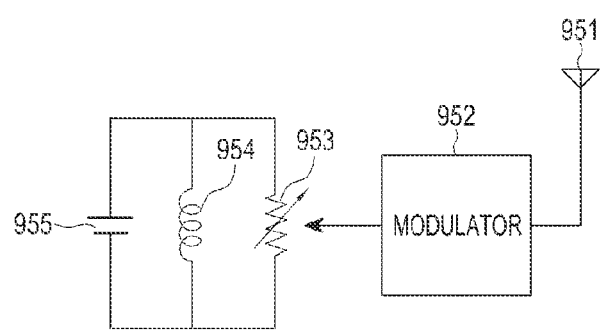
FIG. 9 illustrates a coordinates indication device according to another embodiment of the present invention.

FIG. 9 illustrates a coordinates indication device according to another embodiment of the present invention.

Referring to FIG. 9, the coordinates indication device includes an antenna 951, a modulator 952, a variable resistor 953, a coil 954, and a capacitor 955. The modulator 952 modulates signals of the resonant circuit 954 and 955 according to the strengths of Tx signals received through the antenna 951. For example, if a Tx signal is relatively strong, the modulator 952 adjusts resonance strength to a relatively large value by reducing the magnitude of resistance of the variable resistor 953. If a Tx signal is relatively weak, the modulator 952 adjusts resonance strength to a relatively small value by increasing the magnitude of resistance of the variable resistor 953. Thus, the coordinates measurement device determines the strengths of the Tx signals transmitted from the channel electrodes to the coordinates indication device based on the resonance strength.

As is apparent from the above description, the present invention provides a coordinates indication device and coordinates measurement device which determines a touched position of an object touching over a small area such as a stylus pen, although one touch screen is used. Particularly, the coordinates measurement device can determine the input positions of a finger and a stylus pen just with the one touch screen.

While the present invention has been particularly shown and described with reference to certain embodiments thereof, it will be understood by those of ordinary skill in the art that various changes in form and details may be made therein without departing from the spirit and scope of the present invention as defined by the following claims.

What is claimed is:

1. A coordinates measurement apparatus that determines a position of a coordinates indication device, the coordinates measurement apparatus comprising:
   a channel electrode unit including a first channel electrode that outputs a first drive signal and a second channel electrode that outputs a second drive signal in an order, the first drive signal and the second drive signal being output with a same transmission signal strength;
   a receiver, which is disposed separately from the channel electrode unit in a same plane, which receives in time series, from the coordinates indication device having received the first drive signal and the second drive signal, a first resonance signal having a first strength corresponding to a measured strength of the first drive signal and a second resonance signal having a second strength corresponding to a measured strength of the second drive signal, wherein the first strength and the second strength are different from each other depending on respective distances between the first channel electrode and the coordinates indication device and the second channel electrode and the coordinates indication device; and
   a controller that determines the position of the coordinates indication device on the channel electrode unit based on the order in which the first channel electrode and the second channel electrode respectively output the first drive signal and the second drive signal, the first strength of the first resonance signal, and the second strength of the second resonance signal.

2. The coordinates measurement apparatus of claim 1, wherein the first channel electrode outputs the first drive signal during a first time period and the second channel electrode outputs the second drive signal during a second time period.

3. The coordinates measurement apparatus of claim 2, wherein the receiver receives the first resonance signal during a third time period and receives the second resonance signal during a fourth time period.

4. The coordinates measurement apparatus of claim 3, wherein the controller compares the first strength of the first resonance signal and the second strength of the second resonance signal, and determines the position of the coordinates indication device according to a result of the comparison.

5. The coordinates measurement apparatus of claim 4, wherein the controller determines a stronger resonance signal between the first resonance signal and the second resonance signal according to the result of the comparison, and determines a channel electrode corresponding to the stronger resonance signal as the position of the coordinates indication device.

6. The coordinates measurement apparatus of claim 1, wherein the channel electrode unit capacitively couples with the coordinates indication device.

7. The coordinates measurement apparatus of claim 6, wherein the channel electrode unit outputs the first drive signal and the second drive signal to the coordinates indication device in a form of an electric field.

8. The coordinates measurement apparatus of claim 1, wherein the receiver inductively couples with the coordinates indication device.

9. The coordinates measurement apparatus of claim 8, wherein the coordinates indication device outputs the first resonance signal and the second resonance signal in a form of a magnetic field.

10. A coordinates measurement apparatus that measures a position of a coordinates indication device, the coordinates measurement apparatus comprising:
   a first channel electrode that outputs a first drive signal and a second channel electrode that outputs a second drive signal in an order during a first time period, the first drive signal and the second drive signal being output with a same transmission signal strength;
   a coil configured to receive in time series, during a second time period, from the coordinates indication device having received the first drive signal and the second drive signal, a first resonance signal having a first strength corresponding to a measured strength of the first drive signal and a second resonance signal having a second strength corresponding to a measured strength of the second drive signal; and
   a controller configured to determine a position of the coordinates indication device based on the order in which the first channel electrode and the second channel electrode respectively output the first drive signal and the second drive signal, the first strength of the first resonance signal, and the second strength of the second resonance signal.

11. The coordinates measurement apparatus of claim 10, the first channel electrode outputs the first drive signal and the second channel electrode outputs the second drive signal one after another.

12. The coordinates measurement apparatus of claim 10, wherein each of the first channel electrode and the second channel electrode capacitively couples with the coordinates indication device.

13. The coordinates measurement apparatus of claim 10, wherein the coil inductively couples with the coordinates indication device.

14. A coordinates measurement system that measures positions of a finger and a coordinates indication device other than the finger, the coordinates measurement system comprising:
   a channel electrode unit including a first channel electrode and a second channel electrode, in which when the finger approaches the channel electrode unit, capacitance of at least one of the first channel electrode and the second channel electrode or capacitance between the first channel electrode and the second channel electrode is changed;
   a driver that applies an electrical signal to the channel electrode unit so that the first channel electrode outputs a first drive signal and the second channel electrode that outputs a second drive signal in an order, the first drive signal and the second drive signal being output with a same transmission signal strength;
   a receiver, which is disposed separately from the channel electrode unit in a same plane, which receives in time series, from the coordinates indication device having received the first drive signal and the second drive signal, a first resonance signal having a first strength corresponding to a measured strength of the first drive signal and a second resonance signal having a second strength corresponding to a measured strength of the second drive signal, wherein the first strength and the second strength are different from each other depending on respective distances between the first channel electrode and the coordinates indication device and the second channel electrode and the coordinates indication device; and
   a controller that determines an input position of the finger based on a variation in the capacitance of at least one of the first channel electrode and the second channel electrode or the capacitance between the first channel electrode and the second channel electrode, and determines the position of the coordinates indication device based on the order in which the first channel electrode and the second channel electrode respectively output the first drive signal and the second drive signal, the first strength of the first resonance signal, and the second strength of the second resonance signal.

15. The coordinates measurement system of claim 14, wherein the receiver receives information indicating the same strength of the first drive signal and the second drive signal through at least one of an acoustic wave, an ultrasonic wave, visible light, infrared light, and an electromagnetic signal.

16. The coordinates measurement system of claim 14, wherein the coordinates indication device transmits a signal changing according to contact or non-contact of the coordinates indication device, and
   wherein the controller determines whether the coordinates indication device has touched based on a change of the signal.

17. The coordinates measurement system of claim 14, wherein the coordinates indication device transmits a signal changing according to a touched pressure, and
   wherein the controller determines whether the coordinates indication device has been touched based on a change of the signal.

18. The coordinates measurement system of claim 14, wherein the coordinates indication device includes a switch for controlling an operation state and transmits a signal changing according to the operation state of the switch to the receiver.

19. The coordinates measurement system of claim 14, further comprising a connecting electrode line that connects the channel electrode unit to the driver,
   wherein the receiver and a part of the connecting electrode line are arranged in the same plane.

20. The coordinates measurement system of claim 14, wherein the receiver includes a transparent electrode.

* * * * *